United States Patent [19]

Shiota

[11] Patent Number: 4,875,071
[45] Date of Patent: Oct. 17, 1989

[54] SHADING CORRECTING APPARATUS FOR PHOTOGRAPHIC PRINTER

[75] Inventor: Kazuo Shiota, Kanagawa, Japan

[73] Assignee: Fuji Photo Film Co. Ltd., Kanagawa, Japan

[21] Appl. No.: 218,409

[22] Filed: Jul. 13, 1988

[30] Foreign Application Priority Data

Jul. 15, 1987 [JP] Japan ................................. 62-176471
Jul. 31, 1987 [JP] Japan ................................. 62-191687

[51] Int. Cl.$^4$ ........................................... G03B 27/72
[52] U.S. Cl. ......................................... 355/20; 355/40
[58] Field of Search ....................... 355/20, 38, 40, 52, 355/68, 77, 69; 352/45–47, 89

[56] References Cited

U.S. PATENT DOCUMENTS 3,772,465 11/1973 Vlahos et al. ..................... 355/40 X
4,172,640 10/1979 Land .................................. 352/46 X
4,344,699 8/1982 McIntosh .............................. 355/20
4,690,546 9/1987 Kuzyk et al. .......................... 355/69

FOREIGN PATENT DOCUMENTS

45-5336 2/1970 Japan ..................................... 103/22

Primary Examiner—L. T. Hix
Assistant Examiner—D. Rutledge
Attorney, Agent, or Firm—Sughrue, Mion, Zinn, Macpeak & Seas

[57] ABSTRACT

A shading correcting apparatus for a photographic printer having a plurality of interchangeable printing lenses and a CRT for illuminating a photographic film to print an image of the photographic film on a photographic material is provided with a first memory in which memorized are data on illumination patterns prepared one individual to each of the interchangeable printing lenses and a second memory for memorizing data which eliminate shading of taking lens and flash light. The shading correcting apparatus is further provided with first and second selecting means for selecting the data of one of the illumination patterns according to a selected printing lens and a taking lens or a flash light. The CRT is controlled by the selected data to make an illumination pattern suitable for correcting shading occurred due to the printing lens used.

9 Claims, 4 Drawing Sheets

SHADING CORRECTING APPARATUS FOR PHOTOGRAPHIC PRINTER

BACKGROUND OF THE INVENTION

The present invention relates to a photographic printer in which a CRT is used as a light source for making a print from a photographic film and, more particularly, to a photographic printer which is capable of correcting shading of an image of a print.

General photographic printers, which use halogen lamps as a light source, is provided with a diffusion box disposed between a halogen lamp and film deck for holding a photographic film, for example a color negative film, so as to illuminate a negative image with a light sufficiently mixed by the diffusion box in order to print the negative image onto a photographic material, for example a color photographic paper, by a printing lens. There is also known (for example in Japanese patent publication No. 45-5336) a photographic printer uses a CRT as a light source since, although an exposure time becomes long, a gradation correction is effected easily.

In those photographic printers, a negative image is, even though illuminated with an uniform light, sometimes not finished as a favorable print due an effect of shading. There are two types of shadings; one occuring upon taking a photograph and the other occuring upon photographic printing.

The former shading is due to an insufficient amount of light passing through the edge of a taking lens and an insufficient amount of light emitted from marginal portion of a strobe. These shadings are significantly produced when compact cameras with built-in strobe is used. And these shadings, which are recorded on negatives, are different in degree depending on negative images. The later shading is due to an insufficient amount of light produced by a printing and an unevenness of light emitted from a light source. These shadings are always constant when a same printing lens is used.

Conventional photographic printers described above cannot correct shadings appeared on negative images due to taking lenses and/or strobes used. On the other hand, in the conventional photographic printers, shadings occurring due to the characteristics of printing lenses are corrected by the use of shading correcting optical systems such as parabola shading lenses or shading correcting plates. However, shadings change depending on the kinds of printing optical lenses, it is necessary to replace such shading correcting optical systems upon changing printing lenses to be used. This is a quite troublesome operation.

OBJECT OF THE INVENTION

It is, therefore, an object of the present invention to provide a shading correction apparatus for a photographic printer which can correct shadings possibly appearing on photographic films.

It is another object of the present invention to provide a shading correction apparatus for a photographic printer which can correct shadings not only possibly appearing on photographic films but also due to the characteristics of printing optical systems.

SUMMARY OF THE INVENTION

For accomplishing the above objects, the present invention provides a shading correction apparatus for use with a photographic prnter which comprises first memory means for memorizing data on a plurality of illumination patterns with which a CRT is controlled to illuminate a photographic film one for each of a plurality of interchangeable printing optical systems, means for selecting one of the illumination pattern data suitable for correcting a shading due to a printing lens used, control means for controlling the CRT to illuminate the photographic film with the selected illumination pattern data.

According to a preferred embodiment of the present invention, the shading correcting apparatus is provided with another or second memory means for memorizing data on a plurality of illumination patterns suitable for correcting various shading patterns possibly appearing on the photographic films due to characteristics of image taking systems such as camera lenses or electronic flashes and another selecting means for selecting one of the illumination pattern data suitable for correcting a shading appeared on the photographic film. An image of the photographic film is illuminated with each illumination pattern and displayed on a monitor to determine or select the most suitable illumination pattern for correcting a shading appeared on the photographic film. The most suitable illumination pattern is used to cause the CRT to illuminate the photographic film to make a print from the photographic film.

According to another preferred embodiment of the present invention, the shading correcting apparatus is provided with means for operating data selected from the first and second memory means. This added data is used to cause the CRT to illuminate the photographic film to make a print from the photographic film. For this operation, the data may be added together or maltiplied. In the case of maltiplication, the first memory means memorizes coefficients as the data on illumination patterns for correcting shadings due to the printing optical systems.

DETAILED DESCRIPTION OF THE DRAWINGS

DETAILED DESCRIPTION OF THE INVENTION

Figure 1:
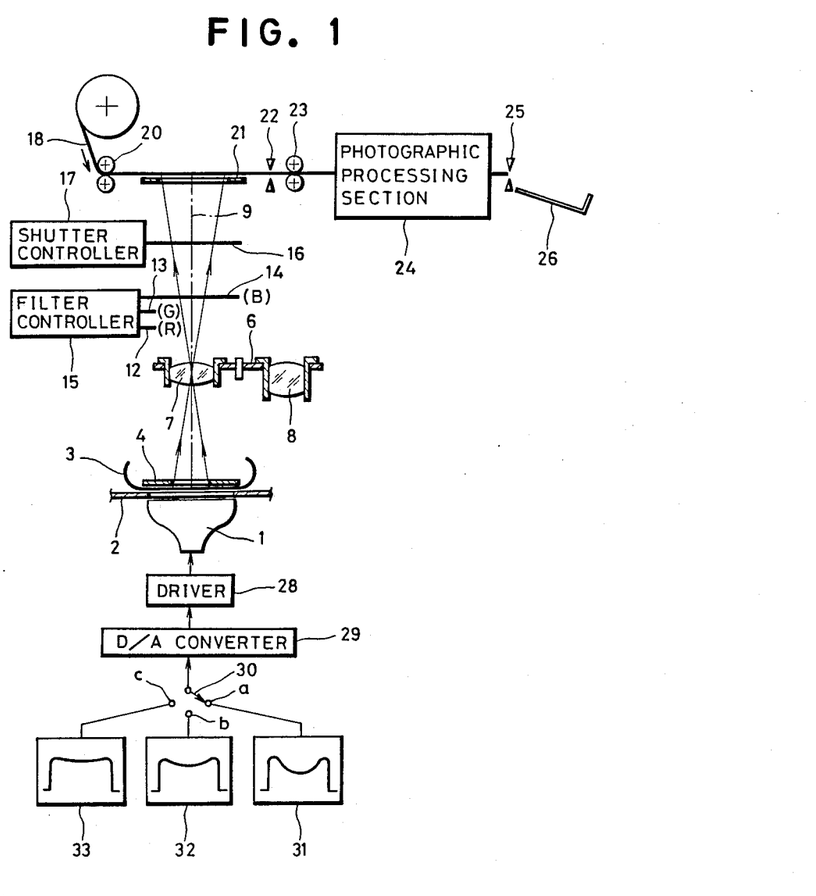
FIG. 1 is a schematic block diagram illustrating a photographic printer according to a preferred embodiment of the present invention.

Referring now to FIG. 1 showing the photographic printer according to a preferred embodiment of the present invention, there is provided a black-and-white CRT 1. The black-and-white CRT 1 is used as a light source to illuminate an original such as a color negative film 3. For keeping the color negative film 3 held by a film holder 2 placed on the CRT 1 flat, there is provided a framing mask 4 which is actuated by a solenoid (not shown) to press down the color negative film 3. Between the black-and-white CRT 1 and a color photographic paper 18, there is provided a printing lens assembly comprising a plurality of, for example three in this embodiment, different focal lengths of printing lenses supported by a lens turret disk 6. In this figure, only two printing lenses 7 and 8 are shown. The lens turret disk 6 is turned to selectively bring the printing lenses in a printing path between the black-and-white CRT 1 and the color photographic paper 18. It will be understood that the turret disk may be replaced with a slidable plate carrying plurality of different focal lengths of printing lenses.

Above the turret disk 6, there are three color filter, namely red (R), green (G) and blue (B) filters 12, 13 and 14 which are driven by a filter controller 15, each color filter being insertable into the printing path 9 independently of the other two so as to make a print from the color negative film 3 in three color frame sequential exposure. Disposed between the turret disk 6 and the masking frame 21 is a shutter 16 controlled by a shutter controller 17 to open and close three times, once for each color, for each exposure.

The photosensitive material such as a color photographic paper 18 is in the form of a roll and is withdrawn by means of a pair of rollers 20 to be placed in an exposure station defined by a framing mask 21. After the exposure of a predetermined number of frames, the exposed photographic paper 18 is cut off to a single strip by a cutter 22 and sent to a photographic processing section 24 by a pair of rollers 23. In the photographic processing section 24, the single strip of exposed photographic paper 18 is subjected to necessary processing and, thereafter, cut to individual prints by a cutter 25. These prints are delivered to a external tray 26.

The black-and-white CRT 1 is selectively connectable to three frame memories 31, 32 and 33 through a driver 28, a D/A converter 29 and a three way selector switch 30. In the frame memories 31 to 33, there are memorized data on illumination patterns suitable for correcting shading occurred depending on the optical characteristics of the respective printing lenses. These frame memory are selectively connected to the black-and-white CRT 1 through the D/A converter 29 and the driver 28. With the data read out from the selected frame memory, the black-and-white CRT 1 is driven to form the selected pattern of illumination so as to illuminate the color negative film 3. In this embodiment, the frame memory 31 memorizes the data on illumination pattern suitable for the printing lens 7 and the frame memory 32 the data on illumination pattern suitable for the printing lens 8.

Each data of illumination pattern is formed, for example, in the following way. At first, a developed negative film without exposure or a developed transparent film with an uniform density which is illuminated with the black-and-white CRT 1 is printed by a printing lens whose shading pattern is to be detected. Then, the print is measured to detect the unevenness of density over the whole area of the print. Data on an illumination pattern which is used to cancel the unevenness of density is set up. In such a way, illumination pattern data are obtained one individual to each printing lens. It is to be understood that, because shading due to the unevenness of luminance of the CRT 1 is measured as to be inherent in the unevenness of density of the print, the data on illumination pattern thus formed is effective to correct shading due to the printing lens and the black-and-white CRT 1 as well.

Figure 2A:
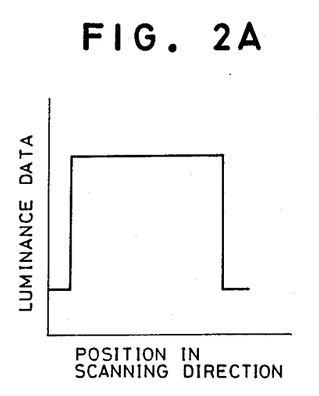
FIGS. 2A, 2B, 2C is graphs showing data on various illumination patterns.
Figure 2B:
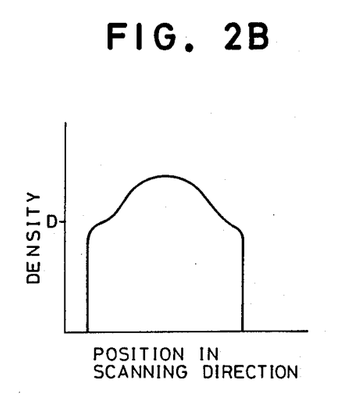
Figure 2C:
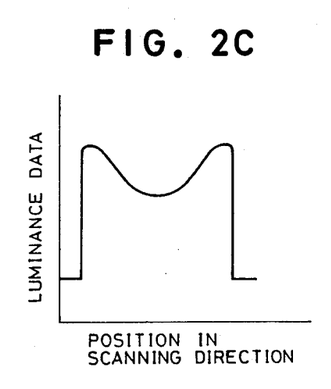

Meanwhile, it is to be noted that the same model of CRTs produce slightly different shading patterns due to optical differences of the CRTs. For this reason, it is preferred to make a shading correction peculiar to each CRT. For this, at first, the frame memory 31 is written with data on a standard illumination pattern (shown in FIG. 2A) by which the CRT is controlled to emit light so as to provide a luminance distribution flat over the phosphor screen. Then, the CRT is excited based on the standard illumination pattern data read out the frame memory 31 to illuminate and print the plain transparent original or a film with an uniform density of film through the printing lens 7 on the photographic paper 18. According to the optical characteristic of the printing lens 7, the print photographically processed shows a density distribution shown in FIG. 2B. The print is measured by a densitometer to detect densities of all the picture elements of the print. Then, based on the detected densities, data on an illumination pattern is calculated so as to control the CRT to have a luminance distribution which makes all the picture elements of a print of the film with an uniform density have a same density as is shown in FIG. 2C. The calculated data is finally written in the frame memory 31. In a same way, data on illumination pattern is formed for each printing lens and written in the corresponding frame memory 32, 33.

In operation of the photographic printer shown in FIG. 1, when the printing lens 7 is placed in the printing path 9, the selector selects the frame memory 31 to read out the illumination pattern data. The illumination pattern data is converted into an analog form by the D/A converter 29 and sent to the driver 28. The CRT 1 is controlled with the illumination pattern data to make an illumination pattern of light suitable for cancelling a possible shading due to the optical characteristics of the printing lens 7 and the CRT 1 to illuminate the color negative film 3.

When a print key (not shown) is operated to start a printing, the red filter 12 is inserted into the printing path 9 and, immediately after, the shutter 16 is opened, so that a red latent image of the color negative film 3 is formed on the color photographic paper 18. After the exposure for a red image, the red filter 1 is replaced with the green filter 13 while the shutter 16 is closed. Then, the shutter 16 is opened again to form a green latent image over the red latent image on the color photographic paper 18. In a same way, a blue latent image is formed on the red and green latent image on the color photographic paper 18. In such a way, a latent image of the color negative film 3 is formed on the color photographic paper 3 in a three color additive frame sequential exposure.

Upon the completion of exposure for one frame, the withdrawing rollers 20 are actuated to withdraw the color photographic paper 18 by one frame, placing an unexposed part thereof in the exposure station while the exposed part is transported by the rollers 23 into the photographic processing section 24 for processing. The exposed part of the color photographic paper 18 is temporarily stocked in a loop in the photographic processing section until a predetermined number of frames are exposed. After the predetermined number of exposures, the exposed part of the color photographic paper 18 is cut off to a print strip and photographically processed, cut by the cutter 25 to individual prints and delivered into the tray 26.

When changing magnification, the lens turret disk 6 is turned to place a desired magnification of printing lens, for example printing lens 8, in the printing path 9. In the case of using the printing lens 8, the selector 30 selects the frame memory 32 by connecting the contact "b" so as to read out the illumination pattern data suitable for correcting shading occurred due to the optical characteristic of the printing lens 8. Then, the CRT 1 is excited with the illumination pattern data to emit light.

Figure 3:
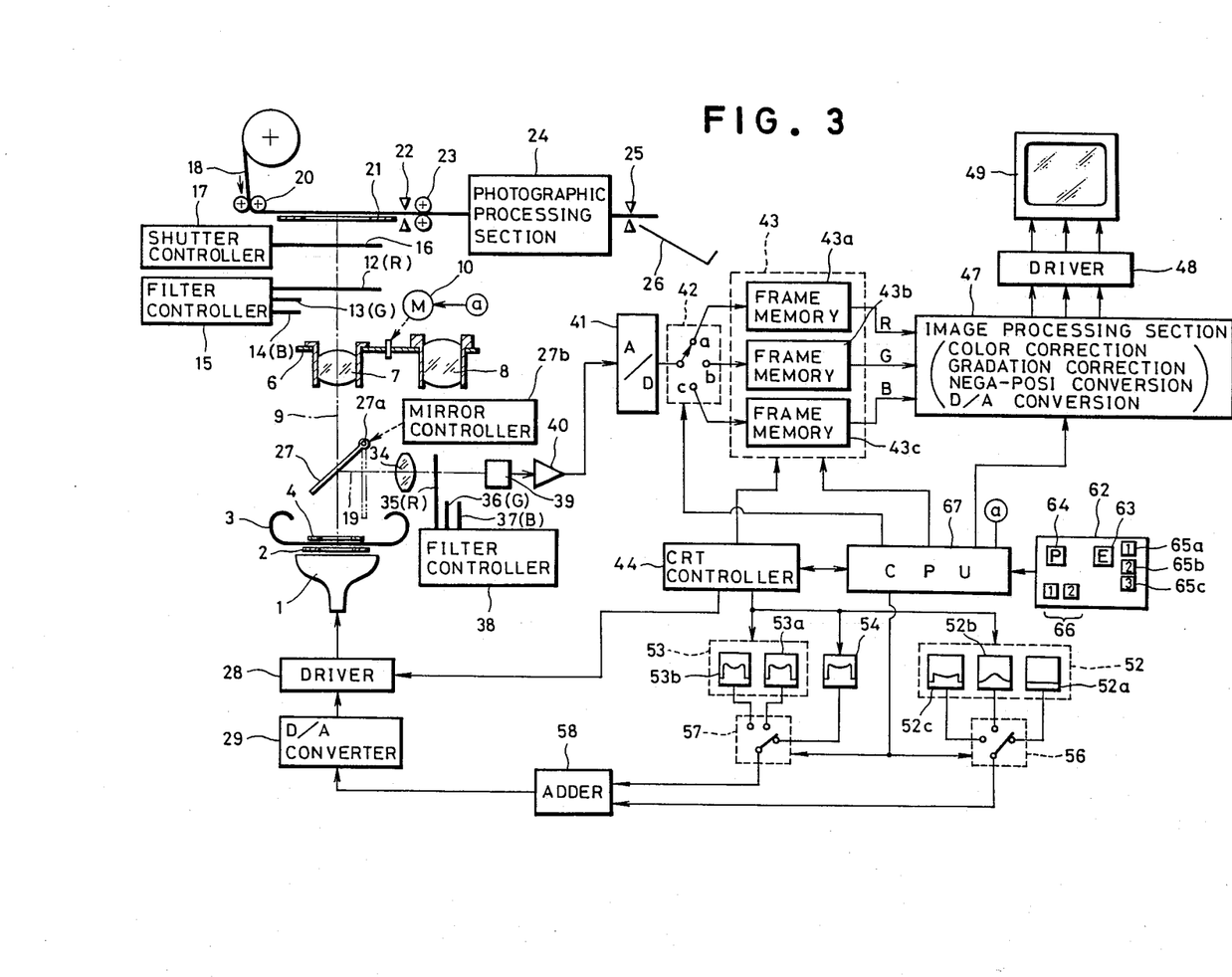
FIG. 3 is a schematic block diagram illustrating a photographic printer according to another preferred embodiment of the present invention.

Referring to FIG. 3 showing a photographic printer according to another preferred embodiment of the present invention, there is provided a mirror 27 pivotally mounted on a shaft 27a and removably disposed in the printing path 9. This mirror 27 which is actuated by a mirror controller 27a is placed in the printing path 9 at an angle of 45°, to thereby reflect light passed through the color negative film 3 toward light detecting means 39 such as a photomultiplier disposed in a monitoring optical path 19 in order to read a frame image of the color negative film 3. The mirror, on the other hand, is removed out of the printing path 9 as is shown by a double-dotted line in FIG. 3 when making a print. It is to ne noted that the mirror 27 may be replaced with a half mirror which is not needed to be removed out of the printing path 9.

When conducting a visual shading inspection, the color negative film 3 is illuminated with a flying spot light produced by the CRT 1. The flying spot light passed through the color negative film 3 is reflected by the mirror 27 to be directed the photomultiplier 39 through a condenser lens 34 disposed in the monitoring path 19 for photoelectric signal conversion.

Further disposed in the monitoring path 19 are three primary color filters, namely red (R), green (G) and blue (B) filters 35, 36 and 37 for three color light measurement. Each color filter 35, 36, 37 is controllably insertable into the image inspection path independently of the other two under the control of a filter controller 28 so as to take an image in three color frame sequence. It is to be noted that the photomultiplier 34 and the light measurement color filters 35 to 37 may be replaced with a color TV camera which is preferably of the type having a frame storage mode in order to avoid flicker effects.

The photomultiplier 39 photoelectrically converts the light passed through the color negative film 3 scanned with a flying spot. Since time serial video signals output from the photomultiplier 39 is feeble, there is provided an amplifier 40 to amplify the feeble output. The amplified video signals are sent to an A/D converter 41 for analog-to-digital conversion. The three color digital video signals are sent to a frame memory section 43 through a three way selector 42.

A frame memory section 36 comprises three frame memories 43a, 43b and 43c one for each color to memory therein video signals selected by the three way switch 42. A CRT controller 44 provides not only a CRT driver 28 for the CRT 1 with synchronizing signals but the frame memory section 43 with address signals corresponding to scanning points on a raster when printing a color negative film 3. Under the presence of address signals the frame memory section 43 writes in video signals therein. After the completon of writing the three color video signals in the respective frame memories 43a, 43b and 43c, the video signals are periodically repeatedly read out from the frame memory section 36 and sent to an image processing section 47 for gradation and color correction, negative-to-positive conversion and digital-to-analog (D/A) signal conversion.

The processed video signals are transferred to a color monitor 49 such as a color CRT through a driver 48 to display the video signals as a color positive image to be printed on its screen. It will be apparent that, when making a print from a color reversal film, no negative-to-positive conversion is conducted in the image processing section 47.

A first illumination pattern memory section 52 is provided to memorize data to provide various illumination patterns of the CRT 1 so as to emit light suitably for correcting shading appeared on the color negative film 3 caused when the color negative film is exposed. In this embodiment, a frame memory 52a memorizes an illumination pattern data suitable for color negatives in which effects of shading are almost negligible. A frame memory 52b memorizes an illumination data suitable for color negatives having effects of shading due to an insufficient brightness of the edge of the image field illuminated by an electronic flash. A frame memory 52c memorizes an illumination pattern data suitable for color negatives having effects of shading due to an insufficient brightness of the edge of the image field of a taking lens. These illumination patterns are statistically obtained on various shading patterns appeared on a large number of negatives.

A second illumination pattern memory section 53 memorizes illumination pattern data for correcting shading caused due to the optical characteristics of the printing lenses. In this embodiment, the illumination pattern memory section 53 comprises three memories 53a, 53b and 53c for memorizing data on the illumination patterns one individual to each printing lens. The illumination pattern data is provided in the same way as described for illumination pattern memories 31 to 32 in the first embodiment.

Upon inspecting the effect of shading appearing in an image to be printed, it is impossible to make a correct decision when displaying on the monitor 49 an image of the color negative film 3 illuminated by the CRT 1 corrected in shading with illumination pattern data for a printing lens. Therefore, there is provided an extra frame memory 54 for memorizing an illumination pattern suitable for correcting the effect of shading due to the CRT 1 and the condenser lens 34. It is to be noted that curves illustrated in the frame memories 52a–52c, 53a–53b and 54 are diagrammatically shown for a single scanning line the flying spot light.

The first and second illumination pattern memory sections 52 and 53 and the extra memory 54 are addressed by the CRT controller 44 to read out an illumination data for each scanning point on the CRT 1 and sent to an adder 58 through the selector 56 and 57 diagrammatically illustrated for addition. As a result of addition, an illumination pattern data is provided suitable for correcting the effects of shading due to the optical characteristics of image taking and printing optical systems. The resulting illumination pattern data is then transmitted to the D/A converter for digital-to-analog signal conversion and, then, to the driver 28. The CRT 1 emits light with an illumination pattern according to the added illumination pattern data.

Connected to a central processing unit (CPU) 67 is a keyboard 62 with a shading inspection key 63, a printing key 64, a illumination pattern selection keys 65a–65c for selecting the illumination pattern data in the first illumination pattern memory section 52, and printing lens selection keys 66. The CPU 67 executes a programmed sequence of operation for the motor 10, exposure filter controller 15, shutter controller 17, mirror controller 27b, light measuring filter controller 38, selector 42, CRT controller 44, image processing section 47, the three way selector 56 and 57, photographic processing section 24, color photographic transporting system (not shown but well known in the art), etc.

Figure 4:
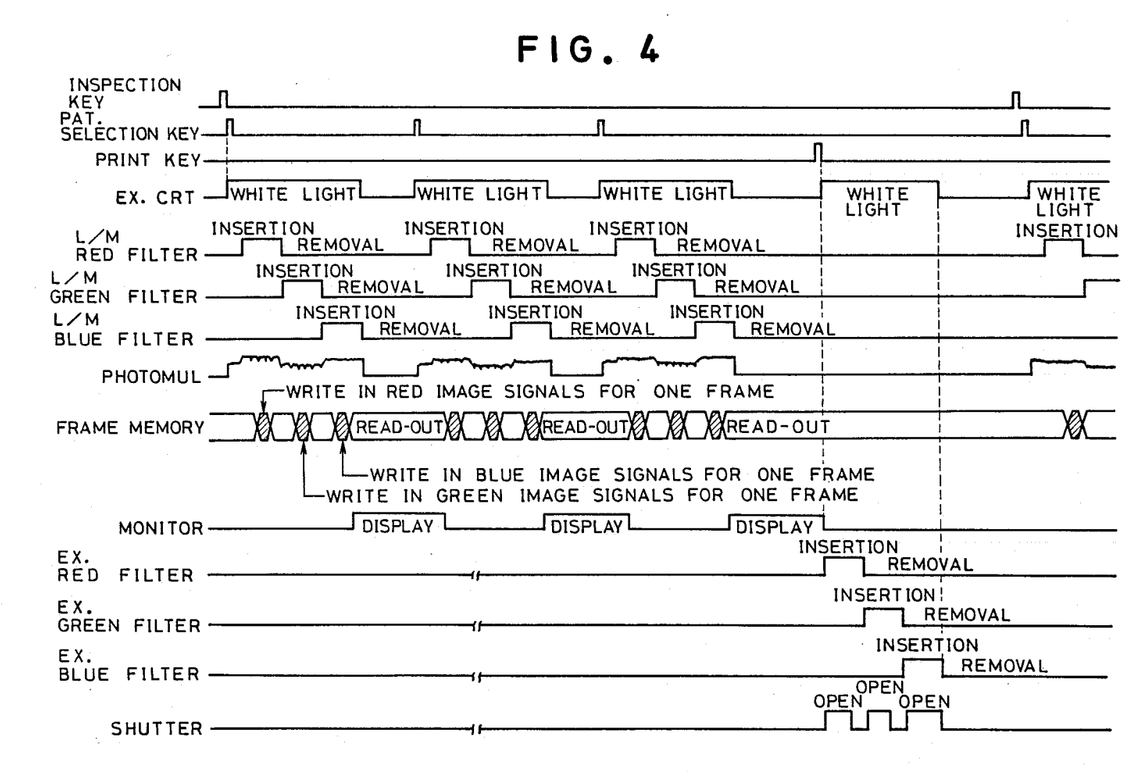
FIG. 4 is a time chart showing the sequence of printing operation of the photographic printer of FIG. 3.

Reference is now had to FIG. 4 for explaining the operation of the photographic printer shown in FIG. 3. Before entering instructions through the keyboard 62, the color negative film 3 is set in the negative carrier 2 and pressed down by the framing mask 4. One of the printing lens selection keys 66 is operated to cause the motor 10 so as to place a desired printing lens, for example the printing lens 7, in the printing path 9.

When the printing lens selection key of the keyboard 62 is operated, the selector 57 is actuated to select the frame memory 53a for reading out the illumination pattern data suitable for correcting shading possibly caused by the CRT 1 and the printing lens 7.

For inspecting the effects of shading appearing on an image, at first the shading inspection key 63 is operated to enter an instruction for shading inspection in the CPU 67. Consequently, the CPU 67 actuates the mirror controller 27b to bring the mirror 27 into the printing path 19 at an angle of 45° to start the shading inspection mode. Simultaneously, the CPU 67 actuates the selector 57 to select the frame memory 54. Thereafter, when one of the illumination pattern selection keys, for example the key 65a, is operated, the frame memory 52a is selected by the selector 56. The CRT controller 44 provides the frame memories 52a and 54a with address signals to read out the illumination pattern data in order. The illumination pattern data thus read out from the frame memories 52a and 54 are added by picture element by the adder 58 and, then, transmitted to the driver 28 through the D/A converter 29. The driver 28 controls the flying spot with synchronizing signals provided by the CRT controller 44 to scan the color negative film 3 placed on the film carrier 2. The flying spot light is controlled in luminance according to the added illumination pattern data.

At the beginning of negative inspection mode, the red filter 35 is inserted into the inspection optical path 19 and the selector 42 selects the frame memory 43a, rendering the photographic printer ready for reading a red image. Immediately after the insertion of the red filter 35, the flying spot light reflected by the mirror 27 is directed to the photomultiplier 39 through the condenser lens 34 and the red filter 35. The photomultiplier 39 photoelectrically converts the red light into time serial signals which in turn are amplified by the amplifier 40 and then converted into a digital form by the A/D converter 41. The digital video signals are sent to the are transferred to the frame memory 43a selected by the selector 42. The CRT controller 44 provides and sends address signals corresponding to positions on the phosphor screen of the CRT 1 scanned with a flying spot to the frame memory 43a. Therefore, the frame memory 43a writes in the red video signals for one frame according to the addresses signals.

After replacing the red filter 35 with the green filters 36, the photomultiplier 39 receives the light reflected by the mirror 23 and passed through the condenser lens 34 and the green filter 36 and transforms the light into time serial video signals. After having been subjected to analog-to-digital signal conversion in the A/D converter 41, the digital video signals are written in the frame memory 43b selected by the selector switch 42.

In just the same way, digital video signals for blue are written in the frame memory 43c selected by the selector 42. It is permissible to provide three light receiving devices and three sets of red, green and blue filters, one set for each light receiving device, to detect simultaneously digital video signals for three color. The CPU 67 reads out the three color video signals from the frame memory 43 and transmits them to the image processing section 47 for the purpose of image processing such as a negative-to-positive image conversion, color and gradation corrections and nega-posi conversion. After such an image processing, the video signals are sent to the color monitor 49 through the driver 48 to display the video images as a positive color image. Through a visual inspection of the image displayed on the monitor 49, the condition of shading correction of the printing optical system is evaluated.

After this visual inspection, the illumination pattern selection key 65b of the keyboard 62 is operated to provide the illumination pattern data retrieved from the frame memory 52b and 54 and added by the adder 58. With the illumination pattern data thus added, the CRT 1 is controlled to provide a flying spot light to scan the color negative film 3 again so as to display a color positive image on the color monitor 49. Through a visual inspection of the color positive image displayed on the color monitor 49, the condition of shading correction of the printing optical system is evaluated.

In a same way, the condition of shading correction of the printing optical system is evaluated for the illumination pattern data memorized in the frame memory 52c by operating the illumination pattern selection key 65c. From the visual evaluations for the three different illumination patterns, the most effective illumination pattern is selected among the three. Based on this evaluation, when, for example, the illumination pattern selection key 65b is operated, the selector 56 is connected to the frame memory 52b.

After the selection of the most effective illumination pattern, the print key 64 is operated to conduct the photographic printing mode. As a result of operation of the print key 64, the CPU 67 causes the mirror controller 27b to remove the mirror 27 from the printing path 19 and the selector 57 to select the frame memory 53a. The CRT controller 44 reads out the illumination pattern data from the frame memory 53a for effecting shading correction for the printing optical system including the CRT 1 and the printing lens 7 which is added together with the most effective illumination pattern data in the frame memory 52b selected as a result of the visual evaluations in the adder 29. With the added illumination pattern data, the CRT 1 is controllably excited to provide a suitable flying spot light so as to scan the color negative film 3.

While the CRT 1 is in operation, the red exposure filter 12 is placed in the printing path 9, the CPU 67 controls the shutter 16 through the shutter controller 17 to open for an exposure time suitable for red, exposing the color photographic paper 18 to the red image.

After the exposure of the photographic paper 18 to the red image, the shutter 16 is closed and the red filter 12 is replaced with the green filter 13. Then, the shutter 16 is opened again to expose the color photographic paper 18 to a green image. In the same way, the color photographic paper 18 is exposed to a blue image. As a result, a color latent image is formed on the color photographic paper 18 in a three color frame sequential exposure. These shading inspection and printing modes are effected for each frame of the color negative film 3.

After the completion of printing of a predetermined number of image frames of the color negative film 18, the cutter 22 is actuated to cut the exposed part of the color photographic paper 18 to a print strip. This print strip is sent to the photographic processing section 24 by the rollers 23 for a necessary photographic processing. Then, the print strip is cut to individual prints by the cutter 25 and delivered into the tray 26.

In order to change printing magnificatin, the printing lens selection key 66 is operated to select another printing lens 8. Then, the lens turret 6 is turned by the electric motor 10 to bring the printing lens 8 into the printing path 9. When the printing lens 8 is selected, data on illumination pattern is read out from the frame memory 53b to be added to data on illumination pattern read out from the first illumination pattern memory 52.

In any embodiment, the exposure color filter 12 to 14 may be replaced with yellow, magenta and cyan cut filters. In this case, color negative films can be printed in a subtractive printing with a single open and close operation of the shutter 16.

Although, in the above embodiment, an image is repeatedly displayed for evaluating the adaptability of illumination patterns previously provided for correcting shadings due to image taking systems, it is permissible to display simultaneously images which are provided under the respective illumination patterns for allowing a quick and easy inspection. It is also permissible to dispose the mirror 27 between the lens turret 6 and photographic paper 18 in place of disposing it between the photographic film 3 and the lens turret 6. In this case, the first and second memories may be replaced with a single memory for memorizing first and second illumination patterns added together.

It is to be noted that the light measurement color filters 35 to 37 may be omitted. In this case, a black-and-white image is displayed on the monitor 49. The present invention is applicable not only to color negative films but to color positive films or black-and-white films. Further, either a light diffusion box in the form of a frustum of a pyramid or a condenser lens may be disposed between the CRT 1 and the film carrier 2.

Although the present invention has been fully described by way of the preferred embodiment thereof with reference to the accompanying drawings, it will be apparent to those skilled in the art that various changes and modifications of the embodiment are possible without departing from the scope of the invention.

What is claimed is:

1. A shading correcting apparatus for a photographic printer having a plurality of interchangeable printing lenses for printing an image of an original illuminated with a CRT on a photographic material, said shading correcting apparatus comprising:
    memory means for memorizing data on illumination patterns of said CRT for each of said plurality of interchangeable printing lens;
    means for selecting said data for one of said plurality of interchangeable printing lenses used, and
    means for actuating said CRT to emit light so as to make an illumination pattern according to said selected data, thereby correcting shading produced due to said used printing lens.

2. A shading correcting apparatus as defined in claim 1, wherein said plurality of interchangeable printing lenses are mounted on a turret disk.

3. A shading correcting apparatus for a photographic printer for printing an image of a photographic film illuminated with a CRT on a photographic material, said shading correcting apparatus comprising;
    image taking means for taking an image of said photographic film illuminated with said CRT;
    memory means for memorizing data on a plurality of illumination patterns suitable for correcting various patterns of shadings possibly appearing on said photographic film;
    means for selecting said data on one of said plurality of illumination patterns;
    control means for actuating said CRT to emit light with an illumination pattern according to said selected data, thereby displaying an image of said photographic film illuminated with each of said plurality of illumination patterns to select one of said plurality of illumination patterns most suitable for correcting a shading pattern appeared on said photographic film.

4. A shading correcting apparatus as defined in claim 3, wherein said image taking means comprises a mirror for picking up a flying spot light emanating from said CRT and passed through said photographic film and a photoconversion element for photoconverting said spot light picked up by said mirror.

5. A shading correction apparatus as defined in claim 4, further comprising a color filter device for separating said flying spot light into three light components.

6. A shading correcting apparatus as defined in claim 3, wherein said image taking means is a frame storage type TV camera.

7. A shading correcting apparatus for a photographic printer having a plurality of interchangeable printing optical systems for printing an image of a photographic film illuminated by a CRT on a photographic material, said shading correcting apparatus comprising:
    image taking means for taking an image of a photographic film;
    means for displaying said image taken by said image taking means on a monitor;
    first memory means for memorizing data on a plurality of illumination patterns suitable for correcting various patterns of shadings possibly appearing on said photographic film;
    first selecting means for selecting data of one of said plurality of illumination patterns for correcting shading pattern appeared on said photographic film;
    second memory means for memorizing data on a plurality of illumination patterns provided one for each of said plurality of interchangeable printing optical systems suitable for correcting shading occurring due to said each printing optical systems;
    second selecting means for selecting data of one of said plurality of illumination patterns for correcting shading occurred due to said printing optical system used;
    operating means for additively operating said data selected from said first and second memory means; and
    control means for controlling said CRT to emit light with an illumination pattern according to said operated data, thereby displaying an image of said photographic film illuminated with each of said plurality of illumination patterns memorized in said first memory means to select one of said plurality of illumination patterns most suitable for correcting a shading pattern appeared on said photographic film, and causing said CRT to emit light with an illumination pattern controlled according to data on said most suitable illumination pattern and said illumination pattern for said selected printing optical system so as to illuminate said photographic film when making a print.

8. A shading correcting apparatus as defined in claim 7, wherein said image taking means comprising a mirror for picking up a flying spot light emanating from said CRT and passed through said photographic film and a photoconversion element for photoconverting said flying spot light picked up by said mirror.

9. A shading correcting apparatus as defined in claim 7, wherein said image taking means is a frame storage type TV camera.

* * * * *